United States Patent
El Essaili et al.

(10) Patent No.: US 12,518,462 B2
(45) Date of Patent: Jan. 6, 2026

(54) 3D STREAM PROCESSING

(71) Applicant: Telefonaktiebolaget LM Ericsson (publ), Stockholm (SE)

(72) Inventors: Ali El Essaili, Aachen (DE); Natalya Tyudina, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 259 days.

(21) Appl. No.: 18/270,826

(22) PCT Filed: Jan. 5, 2021

(86) PCT No.: PCT/EP2021/050045
§ 371 (c)(1),
(2) Date: Jul. 3, 2023

(87) PCT Pub. No.: WO2022/148524
PCT Pub. Date: Jul. 14, 2022

(65) Prior Publication Data
US 2024/0070958 A1     Feb. 29, 2024

(51) Int. Cl.
*G06T 15/00* (2011.01)
*G06V 10/25* (2022.01)
*H04N 7/01* (2006.01)

(52) U.S. Cl.
CPC .............. *G06T 15/00* (2013.01); *G06V 10/25* (2022.01); *H04N 7/013* (2013.01)

(58) Field of Classification Search
CPC ....... G06T 19/006; G06T 9/001; G06T 15/00; G06T 19/00; G06T 3/40; G06T 3/4092;
(Continued)

(56) References Cited

U.S. PATENT DOCUMENTS

| 11,741,634 B2 | 8/2023 | Graziosi et al. |
| 2014/0019635 A1* | 1/2014 | Reznik ................ H04L 63/0428 709/231 |

(Continued)

FOREIGN PATENT DOCUMENTS

| CN | 111435991 A | 7/2020 |
| JP | 2004-078511 A | 3/2004 |

(Continued)

OTHER PUBLICATIONS

Integraph Hardware Technologies Company, "Metodo, Dispositivo Y Producto De Programa De Computador Para Desmultiplexar Imagenes De Video", (Expediente No. 04-33090), Nov. 30, 2005 (134 pages).

(Continued)

*Primary Examiner* — Hau H Nguyen
(74) *Attorney, Agent, or Firm* — Rothwell, Figg, Ernst & Manbeck, P.C.

(57) ABSTRACT

The application relates to a method for operating a processing entity configured to process a 3D image data stream for transmission over a wireless network to an extended-reality device, including receiving the 3D stream with a first image data stream representing a structure of a real-world object and a second image data stream representing a visual appearance of the real-world object, adding a corresponding transmission-time indication to each of the first image data stream and the second image data stream, resulting in an amended stream comprising an amended first stream and an amended second stream, transmitting the amended stream over the network to the extended reality device, receiving a processing time indication for each of the amended first stream and the amended second stream, and initiating an adapting of at least one of the 3D image data stream and the amended stream based on the processing-time indication.

26 Claims, 13 Drawing Sheets

(58) Field of Classification Search
CPC .............. G06F 3/04815; G06F 3/011; G09G 2340/0435; G09G 2350/00; G09G 2320/0261; H04N 7/013; H04N 21/23439; H04N 19/597; H04N 21/816; H04N 21/238; H04N 19/40
See application file for complete search history.

(56) References Cited

U.S. PATENT DOCUMENTS

| | | |
|---|---|---|
| 2014/0168239 A1 | 6/2014 | Elmieh et al. |
| 2016/0217325 A1* | 7/2016 | Bose ............... G11B 27/17 |
| 2020/0111237 A1 | 4/2020 | Tourapis et al. |

FOREIGN PATENT DOCUMENTS

| | | |
|---|---|---|
| JP | 2022-543365 A | 10/2022 |
| WO | 2020/060813 A1 | 3/2020 |

OTHER PUBLICATIONS

International Search Report and Written Opinion issued in International Application No. PCT/EP2021/050045 dated Nov. 9, 2021 (18 pages).
Ericsson, "pCR 26.998 new use-case on AR conferencing," 3GPP TSG SA4 #110-e meeting, doc. No. S4-201054, Aug. 19-28, 2020 (6 pages).
Banitalebi Dehkordi, A., "3D Video Quality Assessment", Mar. 13, 2018, arXiv:1803.04836 (see section 3.2.2) (157 pages).

* cited by examiner

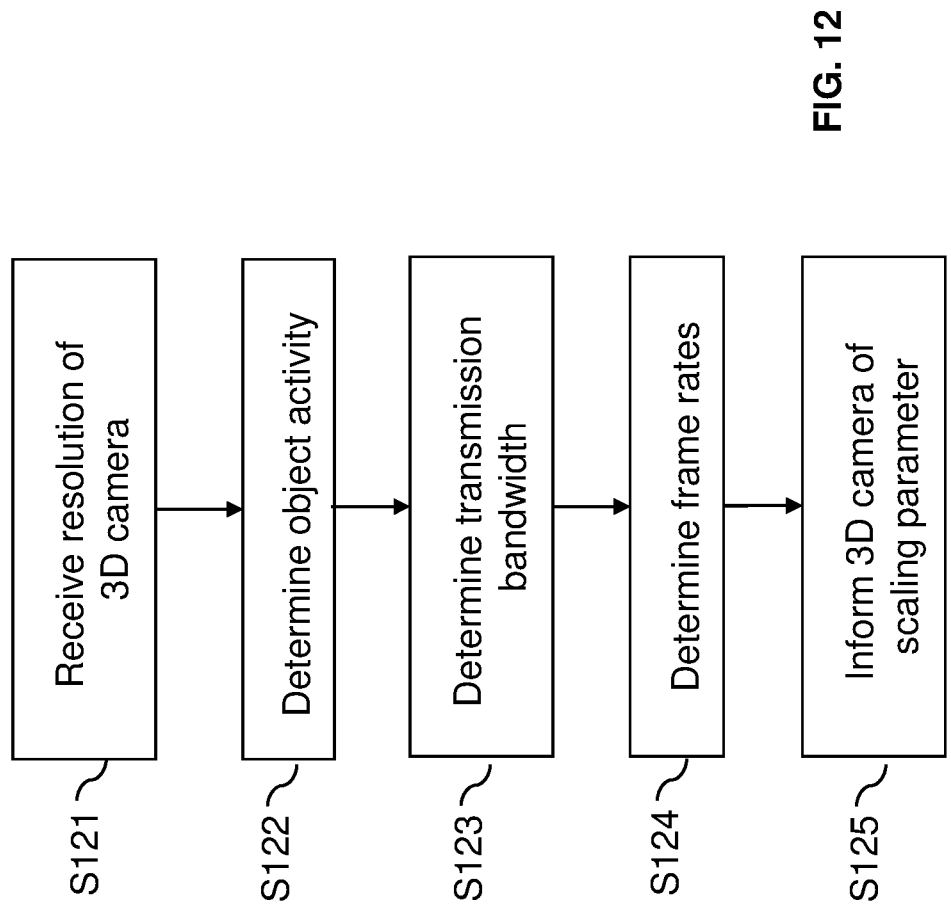

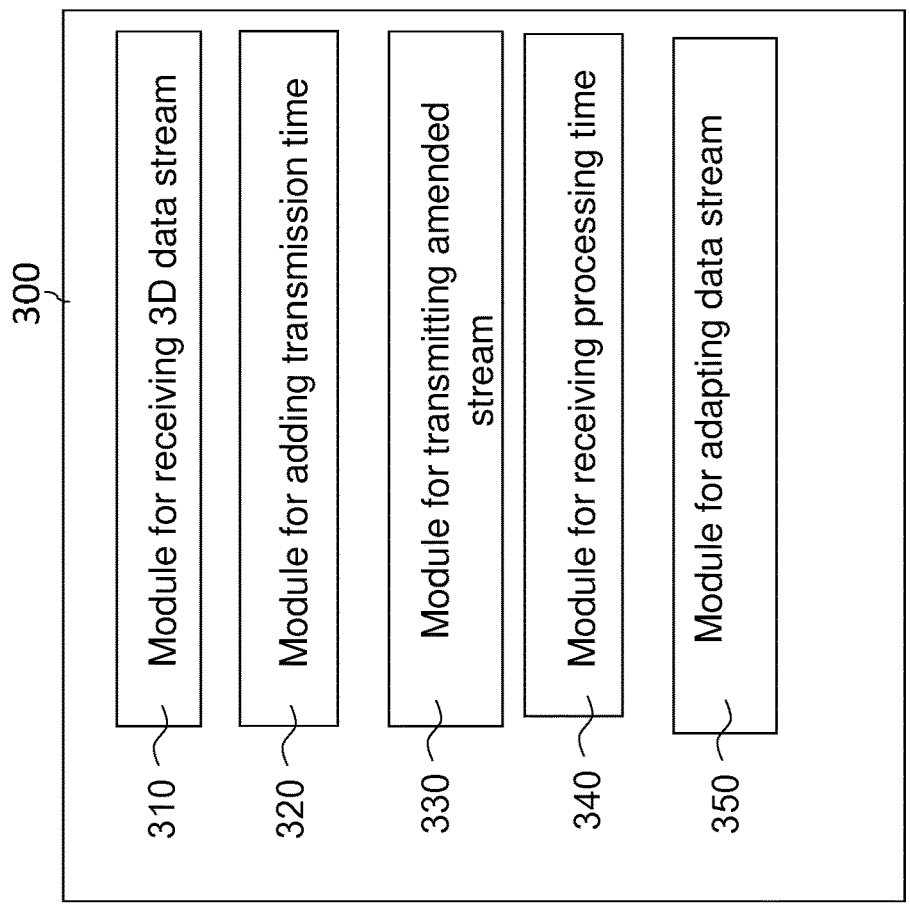

3D STREAM PROCESSING

CROSS REFERENCE TO RELATED APPLICATIONS

This application is a 35 U.S.C. § 371 National Stage of International Patent Application No. PCT/EP2021/050045, filed 2021 Jan. 5.

TECHNICAL FIELD

The present application relates to a method for operating a processing entity and to the corresponding processing entity. Furthermore a computer program and a carrier comprising the computer program is provided. In particular, the embodiments herein relate to processing a 3D image stream data for transmission over a wireless network.

BACKGROUND

Recently, the importance of remote meetings and virtual communications has grown rapidly. In this context, point clouds or any 3D image data stream are streamed from depth cameras to an XR (extended Reality) device, such as augmented reality (AR), mixed reality (MR) or Virtual reality (VR) devices. Point clouds (e.g. 3D image frames) of a 3D content are captured by depth cameras such as Intel Realsense or Microsoft Kinect.

Meshes, textures, and UV maps are commonly used to represent the captured 3D content. Mesh is a data structure that defines the shape of an object in ARNR. There are different mesh topology types e.g. triangle, line or point meshes. A type indicates the way the mesh surface is created using triangulation, points, or lines, where each line is composed of two vertex indices and so on. Meshes contain edges and vertices to define the shape of the 3D content.

UV mapping is a 3D modeling process of projecting a 2D image to a 3D model's surface for texture mapping. With UV mapping it is possible to add color to the polygons that make up a 3D object. The UV mapping process involves assigning pixels in the image to surface mappings on the polygon. The rendering computation uses the UV texture coordinates to determine how to paint the three-dimensional surface.

Texture is a digital 2D picture of the object (also referred to as RGB image). The combination of mesh, texture and UVs creates a 3D representation of a scene represented in the 3D image stream. By extracting a human from the mesh and texture and applying UVs it is possible to create a 3D representation of the human which can be captured from different angles.

Streaming of 3D image data is bandwidth intensive. The average data volume in 480×640 resolution of one frame containing mesh, UVs and texture is 11 MB, which, in case of 60 frames per second, results in a data volume of 600 MB per second. For HD or UHD resolution, the bitrate is in the order of GB per sec. Compression of 3D image to data is not mature yet. As a result, streaming of 3D image data with bandwidth requirements of 600 MB/sec over mobile networks is an issue. Even when compression becomes available, there will be impacts on quality and approaches for optimizing the delivery of 3D image data are still needed. FIG. 1 provides a high-level system architecture for over-the-top streaming of point clouds generated by a depth camera to XR devices such as AR glasses. The requirements on the network are very high in terms of bandwidth, latency and jitter (latency variation).

A 3D or depth camera 80 generates a 3D image data stream wherein point cloud generation and encoding may be carried out at a computer or gaming console 20 or at the depth camera. The stream is transmitted over a wireless (e.g. cellular) network to a mobile entity or UE 30, where decoding and rendering is carried out. A user wearing an extended reality device 70 and connected to the UE can watch the 3D image data stream using device 70.

3D image data streams also have problems with synchronizing data due to bigger mesh rendering time as compared to rendering a pure 2D image. Textures and UVs processing is eight times faster than a mesh processing that leads to a mismatch of a surface defined by the mesh and the corresponding texture. By way of example, when rendering a person's image, if a person's head moves fast from left to right, the mesh remains with head in a front position while the texture and UV map associated with the persons image already turned left. As a result, in the left position, the person image renders a nose in a cheek shape.

Accordingly, a need exists to overcome the above-mentioned problems and to improve the processing and displaying of a 3D image data stream which is transmitted over a wireless network such that the mismatch discussed above is minimized.

SUMMARY

This need is met by the features of the independent claims. Further aspects are described in the dependent claims.

According to a first aspect a method for operating a processing entity is provided which is configured to process a 3D image data stream for transmission over a wireless network to an extended reality device. The method comprises the step of receiving the 3D image data stream wherein the 3D image data stream comprises a first image data stream representing a structure of at least one real world object wherein the 3D image data stream comprises a second image data stream representing a visual appearance of the at least one real world object. The processing entity adds a corresponding transmission time indication to each of the first image data stream and the second image data stream so that an amended stream is generated comprising an amended first stream and an amended second stream. The amended stream is transmitted over the wireless network to the extended reality device and the processing entity receives from the extended reality device a processing time indication for each of the amended first stream and the amended second stream. Furthermore, an adaptation of at least one of the 3D image data stream and the amended stream is initiated based on the processing time indication of the amended first stream and the amended second stream.

Furthermore, the corresponding processing entity is provided operative to work as discussed above or as discussed in further detail below.

As an alternative, a processing entity is provided which is configured to process the 3D image data stream for the transmission over the wireless network to the extended reality device, wherein the processing entity comprising a first module configured to receive the 3D image data stream wherein the 3D image data stream comprises a first image data stream representing the structure of at least one real world object and a second image data stream representing a visual appearance of the at least one real world object. The processing entity comprises a second module configured to add a corresponding transmission time indication to each of the first image data stream and the second image data stream so that an amended stream is generated comprising an amended first stream and an amended second stream. The processing entity comprises a third module configured to transmit the amended stream via a wireless network to the extended reality device. A fourth module is provided configured to receive a processing time indication for each of the amended first stream and the amended second stream from the extended reality device. A fifth module of the processing entity is configured to initiate an adapting of at least one of the 3D image data stream entity amended stream based on the processing time indication of the amended first stream and the amended second stream.

With the inclusion of the transmission time indication and the reception of the processing time, the processing entity can deduce the transmission and the processing situation at the extended reality device. By way of example, by comparing the amended stream parts, the amended first stream and the amended second stream and the corresponding transmission time indications to the corresponding processing times, it is possible to react to the present conditions and to amend either the 3D image data stream, the amended stream or both streams so that the synchronization of the amended first stream and the amended second stream at the extended reality device is maintained. By way of example the real world object can include a scene representing a human and one or more background objects.

Additionally a method for operating a processing entity configured to receive a 3D image data stream generated by a 3D camera over a wireless network is provided, wherein the 3D image data stream comprises a first image data stream representing a structure of at least one real-world object, and a second image data stream representing a visual appearance of the at least one real-world object. The method comprises the steps of receiving, from the 3D camera, a resolution indicator indicating a resolution of the 3D camera, the step of determining an activity of the at least real-world object shown in the 3D image data stream, and of determining a first frame rate to be used by the 3D camera for the first image data stream and a second frame rate to be used by the 3D camera for the second image data stream taking into account the resolution indicator, the transmission bandwidth and the determined activity. The 3D camera is informed of a scaling parameter determined based on the determined first frame rate and of the second frame rate.

In addition, the corresponding processing entity is provided which is operative to work to as discussed above or as discussed in further detail below.

As an alternative, a processing entity is provided, configured to receive a 3D image data stream generated by a 3D camera over a wireless network, the data stream comprising a first image data stream representing a structure of at least one real-world object, and a second image data stream representing a visual appearance of the at least one real-world object, the processing entity comprising a first module configured to receive, from the 3D camera, a resolution indicator indicating a resolution of the 3D camera. A second module is provided configured to determine an activity of the at least real-world object shown in the 3D image data stream. The processing entity comprises a third module configured to determine a transmission bandwidth of a further wireless network used to transmit the 3D image data stream to the processing entity. A fourth module of the processing entity is configured to determine a first frame rate to be used by the 3D camera for the first image data stream and a second frame rate to be used by the 3D camera for the second image data stream taking into account the resolution indicator, the transmission bandwidth and the determined activity. A fifth module of the processing entity is configured to inform the 3D camera of a scaling parameter determined based on the determined first frame rate and of the second frame rate.

Furthermore, a computer program is provided comprising program code, wherein execution of the program code causes at least one processing unit of the processing entity to execute a method as discussed above or as explained in further detail below.

Furthermore, a carrier comprising the computer program is provided, wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments to described below may be combined with each other in other embodiments unless explicitly mentioned otherwise.

BRIEF DESCRIPTION OF DRAWINGS

The foregoing and additional features and effects of the application will become apparent from the following detailed description when read in conjunction with the accompanying drawings in which like reference numerals refer to like elements.

FIG. 12 shows an example flowchart of a method carried out by the processing entity to configure the entities involved at the beginning of the process.

FIG. 13 shows an example schematic representation of the processing entity configured to synchronize the different parts of a 3D image data stream.

FIG. 14 shows another example schematic representation of the processing entity configured to synchronize the different parts of a 3D image data stream.

DETAILED DESCRIPTION OF EMBODIMENTS

Figure 1:
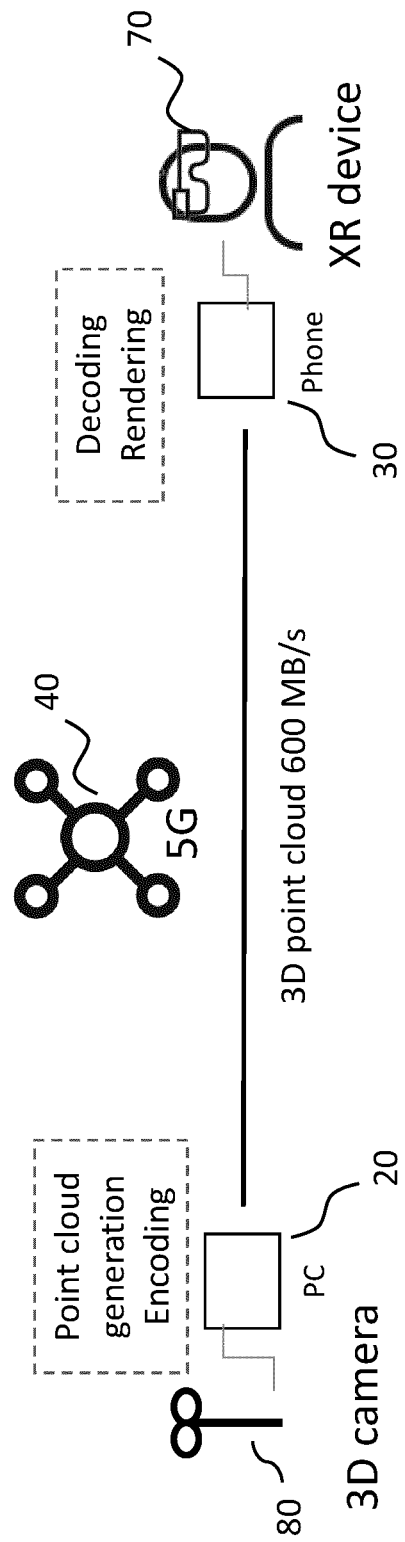
FIG. 1 shows a schematic view of a streaming of a 3D image data stream to an extended reality device over a cellular network as known in the art.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may be implemented by an indirect connection or coupling. Functional blocks may be implemented in hardware, software, firmware, or a combination thereof.

Within the context of the present application, the term mobile entity or user equipment, UE, refers to a device for instance used by a person, a user, for his or her personal communication. It can be a telephone type of device, cellular telephone, mobile station, a cordless phone or a personal digital assistant type of device like laptop, notebook, notepad or tablet equipped with a wireless data connection. The UE may be equipped with a subscriber identity module, SIM, or electronic SIM comprising unique identities such as the IMSI, International Mobile Subscriber Identity, TMSI, Temporary Mobile Subscriber Identity, or GUTI, Globally Unique Temporary UE Identity, associated with the user using the UE. The presence of a SIM within the UE customizes the UE uniquely with a subscription of the user.

For the sake of clarity, it is noted that there is a difference but also a tight connection between a user and a subscriber. The user gets access to the network by acquiring a subscription to the network and by that becomes a subscriber within the network. The network then recognizes the subscriber, by way of example using the IMSI, TMSI or GUTI or the like and uses the associated subscription to identify related subscription data. A user can be the actual user of the UE entity and the user may also be the one owning the subscription, but the user and the owner of the subscription may also be different.

In the following, a transmission of a point cloud stream or 3D image data stream is discussed, which is captured by a depth camera or 3D camera and which is optimized and later transmitted to an extended reality device. In the following point cloud stream or 3D image data stream is used interchangeably. In the same way a 3D camera corresponds to a depth camera.

As will be explained below a processing entity, preferably implemented as cloud function, is provided, which can be used for scaling and synchronizing the 3D image data stream including the meshes and textures, based on network conditions, device capabilities and movements of a user (i.e. user activity) shown in a scene presented in the 3D image data stream. Network information and user activity might be used to determine the requirements for transmitting meshes and texture and scaling the 3D image data stream data accordingly. Furthermore, feedback from the extended reality device, about the actual processing times including rendering time are considered for the different components of the 3D image data stream to determine instances where a new part of the 3D image data stream such as a new mesh is needed or when the mesh updates are to be provided.

The present application addresses two problem areas for real-time 3D communications. First of all, the frame rate for transmission of the structure shown in the image data stream (also called first image data stream), such as mesh and part of the image data stream representing the visual appearance (also called second image data stream), such as the texture, is adapted to scale based on the network bandwidth and the user activity. Secondly, the different parts of the 3D image data stream namely the part or data stream representing the structure of the object shown in the scene of the image data stream (also named first amended stream hereinafter) or the stream including the visual appearance (also called second amended stream hereinafter) are transmitted at different frame rates based on the processing or rendering times at the XR device. The application furthermore addresses the need for an uplink or production edge functions and downlink/distribution edge functions for 3D communications by providing processing entities located preferably at the edges of the cloud as discussed in further detail in connection with FIGS. 2 and 3.

Figure 2:
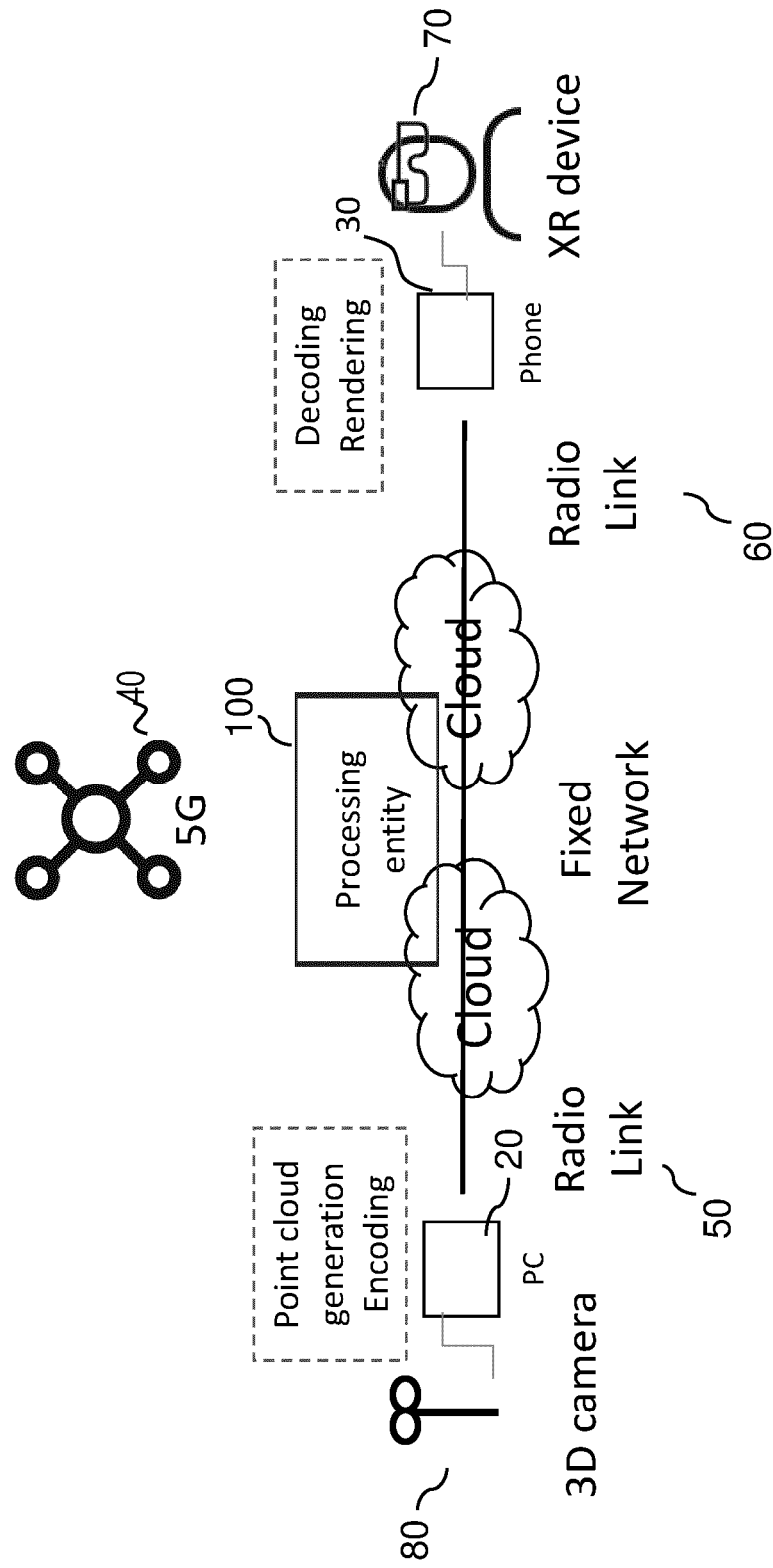
FIG. 2 shows a schematic view of the architecture including a processing of a 3D image data stream which overcomes the problems known in the art and comprises features of the invention.

FIG. 2 provides an end-to-end system overview for streaming of 3D image data streams or point clouds from a 3D camera 80 to an XR device 70, wherein cloud components are provided in the communication path. The communication path may contain a first radio link or part of a wireless network 50 which describes the uplink connection from the 3D camera to the Internet and to a processing entity 100, which will process the 3D image data stream such that difference in processing times (of the first image data stream and the second image data stream) occurring at the extended reality device are taken into account. Furthermore, a radio link 60, a downlink radio link or wireless network is provided towards the extended reality device 70. FIG. 2 shows two cloud components, a first cloud component or server, which is close to the 3D camera and a further cloud server or component close to the XR device 70.

A point cloud stream scaling and/or point cloud stream synchronization is proposed in order to provide an optimized 3D point stream based on network conditions, user activity and device characteristics. The generation of the 3D image data stream occurs at the 3D camera and the stream rendering is performed at the XR device 70. The camera may be connected to the PC, e.g. via a USB cable, and the camera and the device 70 can be connected to some UE for a connection to a cellular or wireless network. It is also possible, that the stream rendering may occur at the connected user equipment (UE), so that the device 70 operates as a tethering device.

In the embodiment shown in FIG. 2, as explained below, the adaptation of the frame rate for the transmission based on the network bandwidth and the user activity is performed in the same entity as the synchronization of the different parts of the 3D image data stream based on the processing time at device 70.

The processing time is a time duration after the reception of a frame of the 3D image data stream until the rendering of a frame which includes several time components such as the transmission, buffering and any decoding or processing, including rendering at device 70.

Figure 3:
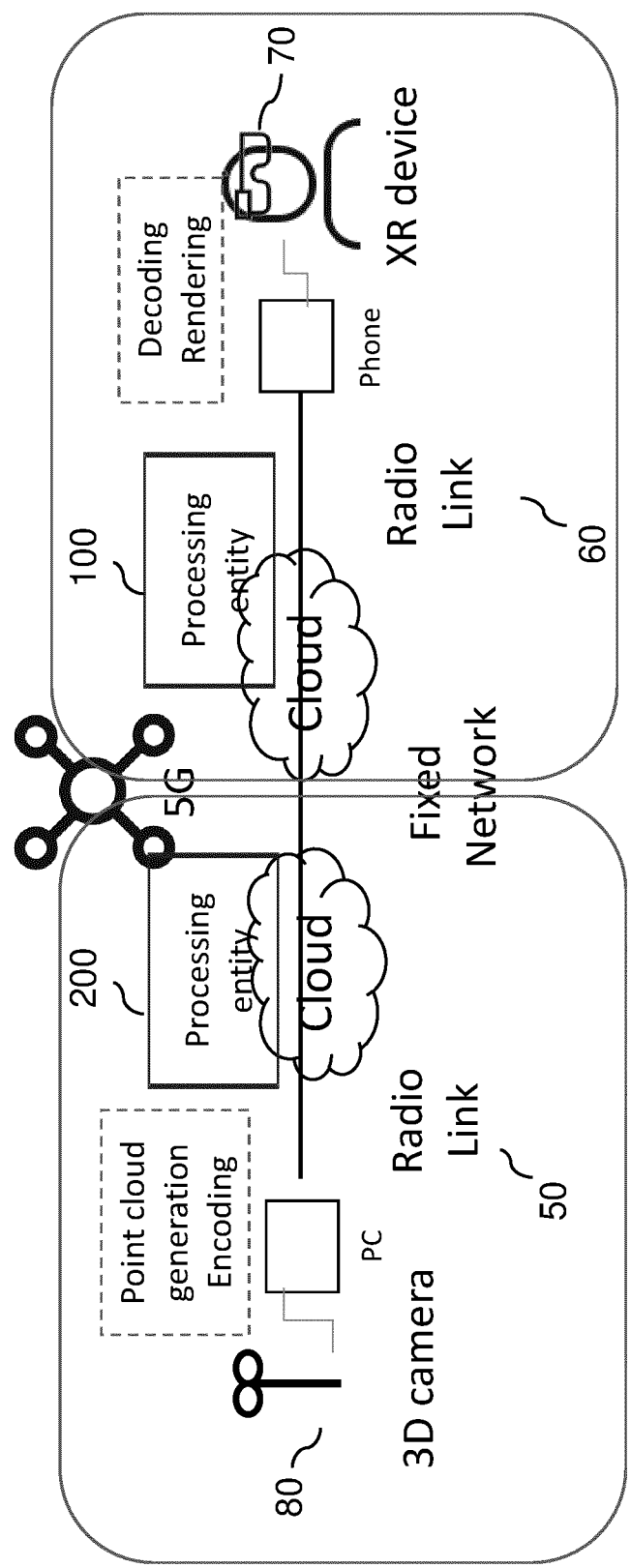
FIG. 3 shows another schematic view of the architecture for processing the 3D image data stream which overcomes the problems known in the art and comprises features of the invention.

FIG. 3 shows a similar situation as shown in FIG. 2, however, the different functional steps including the adaptation of the frame rate in view of the current environmental conditions and the transmission of the different stream parts based on the rendering or processing time are carried out in different components 200 or 100. Processing entity 200 is responsible for the scaling of the meshes and textures in the 3D image data stream based on the device, network configuration such as transmission bandwidth and user activity. Processing entity 100 is responsible for controlling the different frame rates of the different parts of the 3D image data stream such that the rendering does not cause distortion or delay at the XR device 70.

The following sections describe the first part, namely the scaling of the 3D image data stream based on the device configuration, network conditions and user activity. In the embodiment of FIG. 2, the scaling is carried out by the processing entity 100, wherein in the embodiment of FIG. 3, the scaling is carried out by the processing entity 200. The optimal scaling for the 3D image data stream is performed by the cloud, at a processing entity 100 or 200. The 3D image data stream comprises a first image data stream (part) representing the structure or geometry of a real world object such as a human being, wherein the data stream furthermore comprises a second image data stream (part) representing the visual appearance. The first image data stream can include the mesh, wherein the second image data stream can comprise the texture and UVs. The scaling is done by determining an appropriate scale required for meshes and textures within the 3D stream based on the current network conditions (for example, network bandwidth). The scale is also determined by the requirements for updating the meshes and textures derived from the user activity in order to avoid synchronization issues at the XR device 70. The synchronization issues can happen when textures are arriving quickly and the meshes are not updated due to network issues as also discussed in connection with FIG. 9. The scaling (such as a reduced transmission of the mesh components in the stream) may also be needed to reduce the bandwidth requirement on the network when an update of meshes is not needed due to a low user movement in order to make the streaming of the meshes feasible.

With a huge complexity of point cloud streams, point cloud compression can practically happen at an edge of the cloud at a production side. The problem is before compression, upload large amounts of data need to be uploaded over a wireless uplink to the edge or a cloud. One concrete example is point cloud processing at the edge as carried out by processing entity 100 shown in FIG. 2 or by the processing entity 200 shown in FIG. 3. Here, artifacts or background may be removed and complex operations can be performed on each point cloud data stream. By establishing a close loop with the 3D camera 80 for activity characterization, a new mesh may only be uploaded when needed so that lots of uplink bandwidth and processing time can be saved. A compression may be applied afterwards for thewireless uplink.

The scaling process is discussed in further detail in connection with FIG. 4. The 3D camera 80 transmits the device resolution, the network condition and the user activity to the processing entity 100, 200. The user activity can include an eye movement, a facial expression change or a pose change or any other movement. At least some of these parameters might be used as input to determine the optimal configuration of the 3D camera. A scaling ratio corresponding to the ratio of the frame rate of meshes to the frame rate of a texture/UV is provided to the camera 80 and also to the extended reality device. Extended reality device 70 may also provide its resolution, the display resolution to the processing entity 100, 200.

Figure 5:
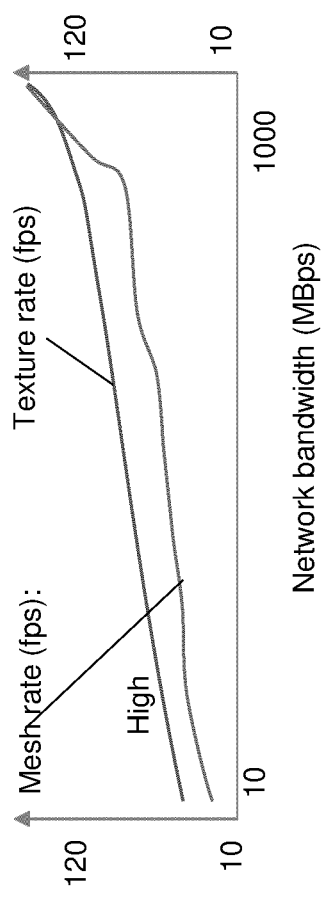
FIG. 5 shows a schematic view of a scaling of meshes and textures as function of the network bandwidth.

FIG. 5 shows a mapping of mesh components and texture components of the 3D image data stream based on measured network conditions. The mesh is part of the data stream representing the structure, and can tolerate higher frame rates at very high bandwidth, however, at lower bandwidth this becomes more challenging leading to an exponential decay. The decline in frame rate of the other part representing the visual appearance, here the texture, is slower due to the lower bandwidth requirement.

Figure 6:
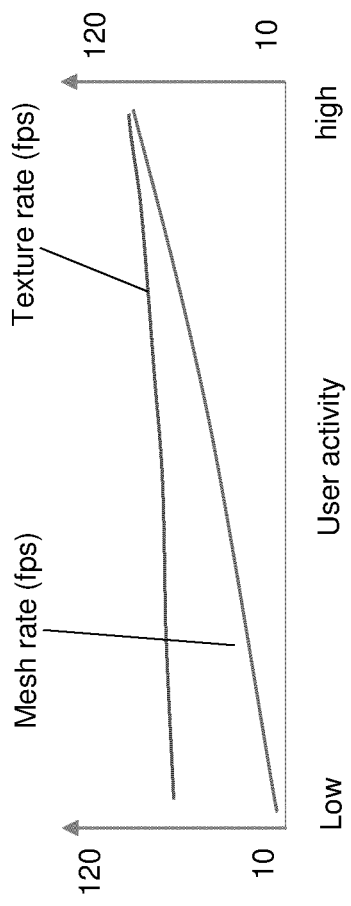
FIG. 6 shows a schematic view of a scaling of meshes and textures as function of a user activity shown in a scene present in the 3D image data stream.

FIG. 6 shows an example where the frame rate of the structural representation and the visual appearance, i.e., the frame rate of meshes and texture is adapted based on a to user activity such as a movement of the user shown in a scene of the 3D image data stream, such as an eye movement, a head pose change or a change of the expression. A higher user activity requires a higher mesh rate to meet the user experience demands. In case of the data part representing the visual appearance, here the texture a relatively high frame rate is needed to maintain the immersive quality in cases of low user activity.

Figure 7:
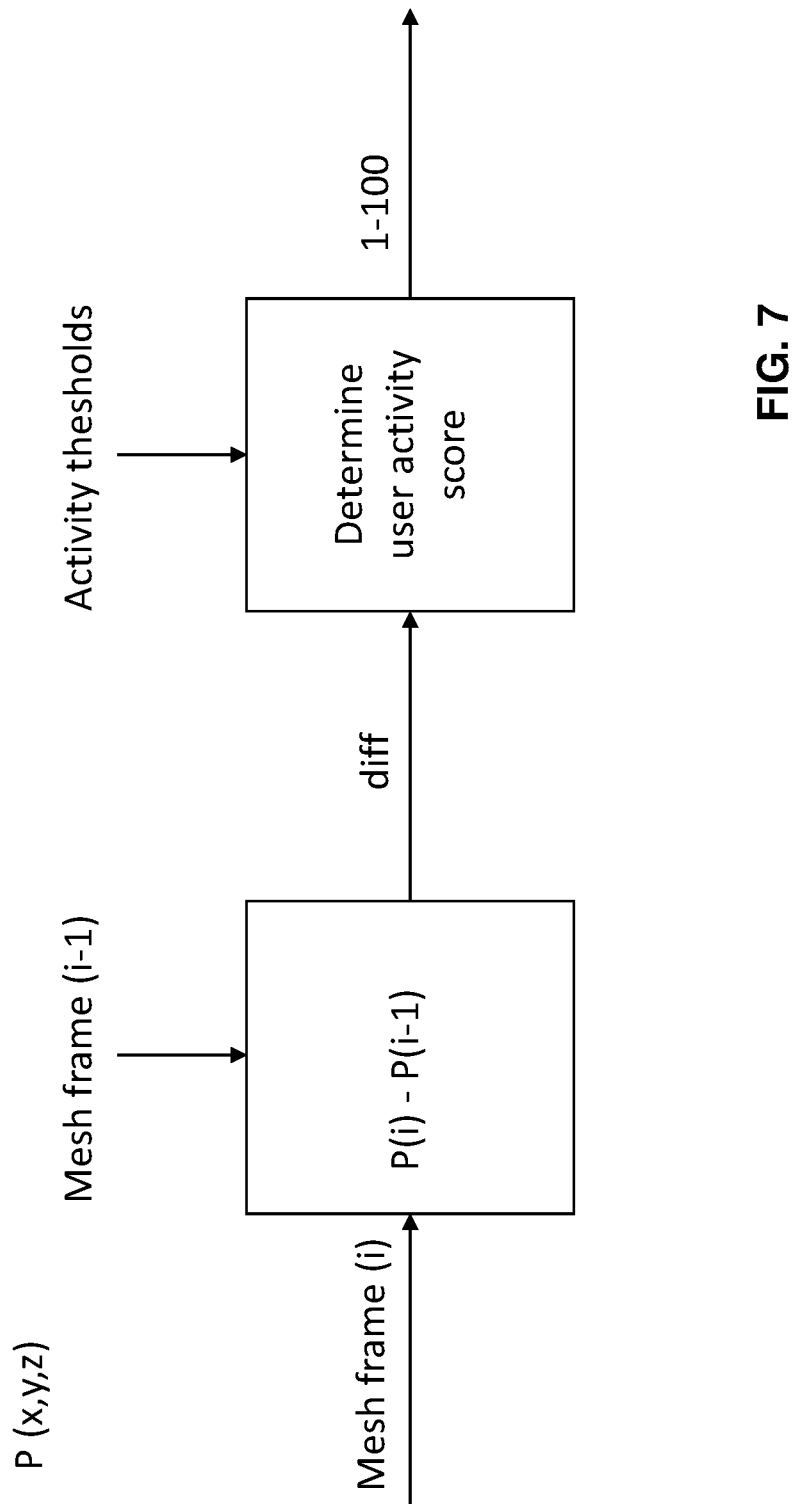
FIG. 7 shows schematically determination of an activity of a human being shown in the image data stream.
Figure 8:
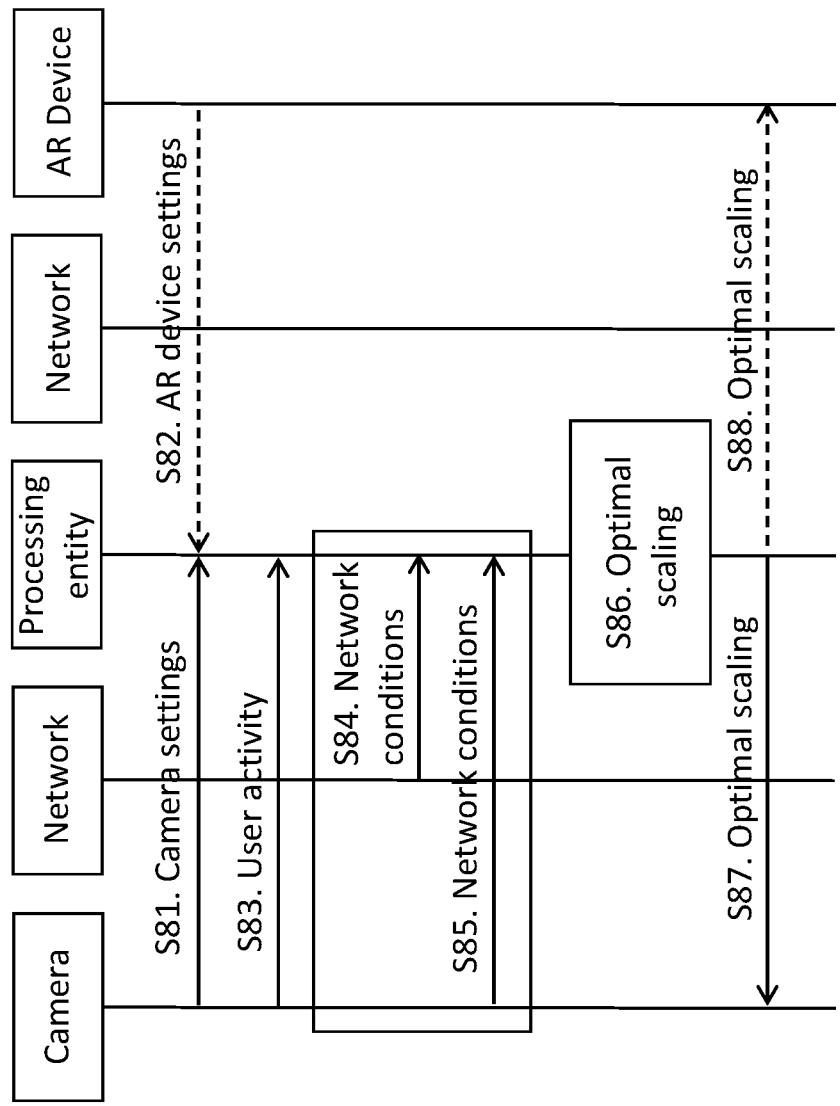
FIG. 8 is a schematic diagram illustrating a sequence of communication between the entities to generate the 3D image data stream based on the current conditions.

The user activity may be determined by considering the difference in the mesh or point cloud coordinates between successive mesh frames as shown in FIG. 7. Each point cloud coordinate may be characterized by the X, Y and Z coordinates. The sum of the differences of all point clouds is fed into a scaled system that determines the user activity score based on activity thresholds. The output may be scaled from 1 to 100 where a scale of 1 represents 'no activity' and a scale of 100 refers to 'highest activity'. Without loss of generality such a scaling model can be trained and adjusted based on different parameters such as content type, complexity, etc. As shown in FIG. 7, the processing entity 100 can carry out the calculation of the user activity score. A further optimized scaling example can consider a generalized activity characterization, such as lip movements, pose changes as follows:

Low activity score=10→Mesh frame rate (20 fps)
Medium activity score=50→Mesh frame rate (40 fps)
High activity score=90→Mesh frame rate (60 fps)
Another optimized scaling metric can be the mesh density while keeping frame rate constant or a combination:
Low activity score=10→Mesh density (X/4 data points)
Medium activity score=50→Mesh density (X/2 data points)
High activity score=90→Mesh density (X data points)
where X corresponds to number of data points in a frame e.g., 10$k$ data points FIG. 8 describes the message exchange for the optimal scaling of meshes and texture performed at the processing entity. FIG. 8 addresses the scenario where the uplink bandwidth is limited and a full point cloud stream cannot be provided in real time to the XR device.

In step S81 the processing entity collects input from the 3D camera about resolutions for meshes and texture, and in step S82 it also optionally receives input from the XR device about display resolution. The XR device may be head mounted display, but it should be understood that the XR device is not limited to a head mounted display, any other XR device may be used. Furthermore, the processing entity collects the user activity input from the camera such as the user movements, rotation and translation movement of the meshes as discussed above in connection with FIG. 7 (S83). Furthermore, the processing entity 100 or 200 receives network information such as the bandwidth and latency information. The network information can be provided by the camera, the UE, or by the network as shown by steps S84 and S85. In step S86, the processing entity determines the optimal scaling based on the received information which defines the rate of meshes and texture or a point cloud stream as will be explained below. In step S87, the resulting optimal scaling which isthe ratio of meshes and texture per second is provided to the 3D camera and optionally in step S88 to the XR device.

In the following, the approach for the point cloud stream synchronization is carried out at the processing entity in the downlink direction to the XR device 70. In the approach discussed below the transmission of the data stream the XR device is adapted based on the processing time thereof. This processing time can include the transmission time on the channel, the additional delays on the XR device 70 such as buffering, decoding, mesh reconstruction and rendering. During the processing of the 3D image data stream following typical delays might be observed. In an example, the processing or rendering of a full mesh on the XR device could take up to 200 ms. Rendering updates or parts of the mesh at the XR device can take around 30 ms. The rendering of a texture and the UV could take up to 30 ms.

Figure 9:
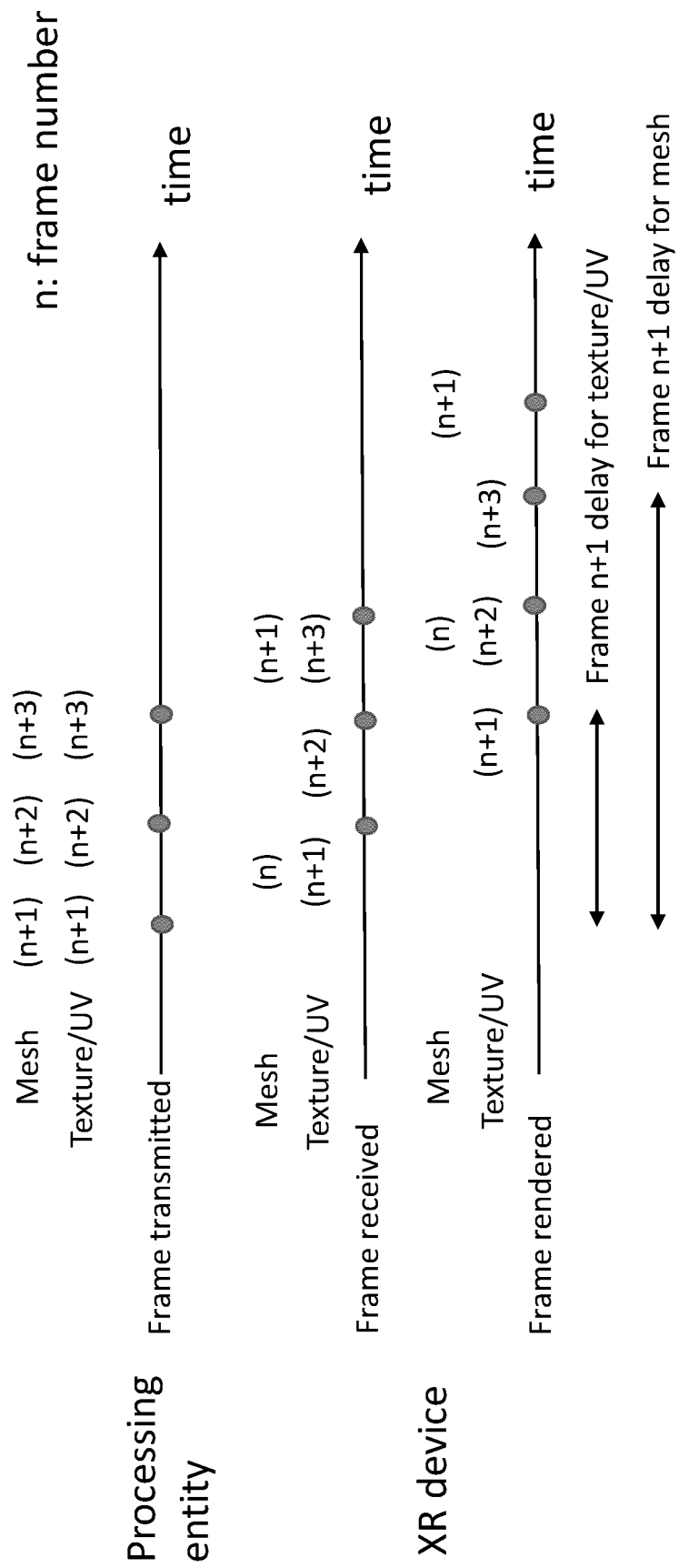
FIG. 9 shows a schematic view of the problem which occurs when textures are processed faster than the meshes which leads to a mismatch on the rendered 3D image.

FIG. 9 addresses the problem of miss match of a surface within the picture when the textures are processed faster than the meshes. At the processing entity, the input meshes and texture or UV are in synchronization. The transmission time for meshes and texture or UV can vary when transmitting a full mesh. At the XR device, the texture or UV are received faster than the meshes (in view of the smaller amount of data of texture or UV). Furthermore, the rendering time for full meshes is larger than for the textures or UV which results in additional delays for the meshes. Accordingly, the situation can occur as shown in FIG. 9, where the texture of frame n+3 is already rendered whereas the mesh for frame n+1 is rendered at approximately the same time. Accordingly, the rendering time, the time when the corresponding part of the data stream is displayed differs for the texture and the meshes.

Figure 10:
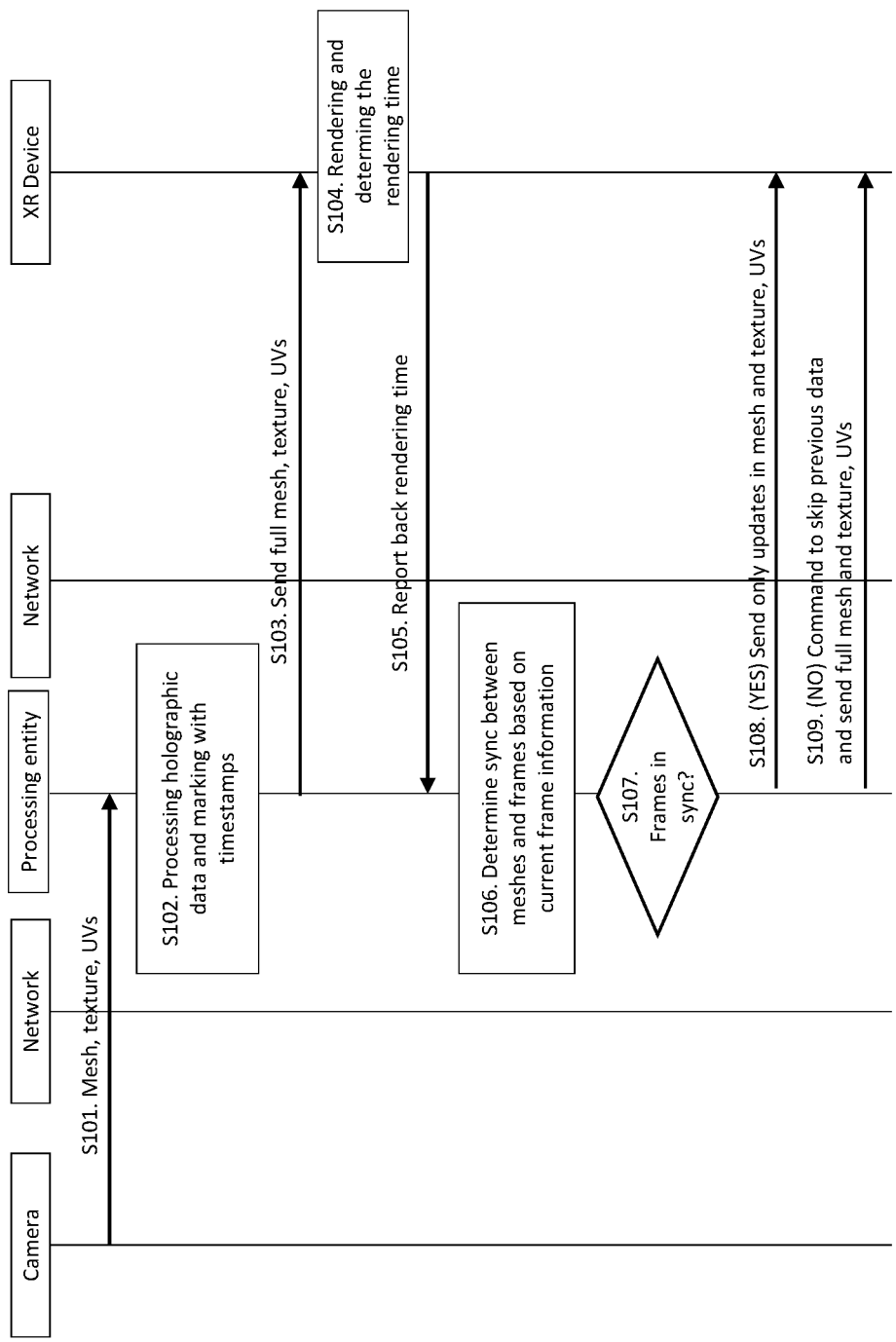
FIG. 10 shows a schematic view of a message exchange between the entities involved in order to overcome the problem shown in FIG. 9 so that the mismatch on the rendered 3D image is avoided at the extended reality device.

FIG. 10 shows a synchronization approach in which the processing entity 100 can send mesh updates based on the rendering time or possessing feedback as received from the device 70. With this solution, the amount of data streamed from the 3D camera to the device 70 is also reduced significantly. Besides that, the synchronization allows to restore functionality after an interrupted connection in an optimal manner.

In step S101 of FIG. 10, the 3D camera sends the 3D image data stream containing mesh, texture and UV to the cloud. In step S102, the processing entity matches mesh, texture and UVs and marks each of them with a timestamp in a specific format and adds the stream to a queue to be later sent to the XR device 70. A possible timestamp can have the following format:

$$yyyy\text{-}MM\text{-}dd\ HH\text{:}mm\text{:}ss.SSS \quad (1)$$

In step S103, during the first frame of frames, the processing entity sends a full mesh, texture and UV to the XR device 70 including the timestamp or transmission time indication.

In step S104, the XR device 70, after receiving the point cloud stream, processes the received data and renders the data with the same timestamp for the end user.

In step S105, the XR device 70 reports the processing time (processing time indication) for each element including mesh, texture and UV. The processing time or rendering time is defined as the time taken to process an element on the XR device 70 and display to the user.

$$Rt[e]=t\_s-t\_d \quad (2)$$

Rt: rendering time
e: element (mesh, texture, UVs)
t_s: timestamp when the data processing started
t_d: timestamp when the data is displayed inside the XR device In step S106, the processing entity 100 receives the processing time indication and compares the received information to the actual timestamps. In step S107, the processing entity 100 checkswhether the frames are in synchronization. If the delay between frames is smaller than a predefined amount of time, the processing entity can send the mesh updates only (instead of a full mesh data) with textures and UVs. With this approach, the amount of data streamed from the camera to the extended reality device is reduced. As a further option, if the delay difference is larger than a predefined threshold, the processing entity sends a command to the device 70 to drop the current queue of 3D data stream and retransmit the latest queue containing the full mesh data, texture and UVs. This allows to restore functionality after the interrupted connection in an optimal manner.

The above discussed scaling and synchronization approaches can be combined, so that the information about the current rendering time from the device 70 is provided to the 3D camera 80. When only mesh updates are required, the processing entity can provide feedback to the 3D camera so that the camera provides an optimized stream to the XR device 70 and saves uplink bandwidth which might be useful for a one-to-one conferencing. The processing entity can furthermore provide feedback to the 3D camera 80 what areas in the mesh require updates. By way of example only the areas in the stream showing a user movement might be updated. Furthermore, it is possible to predict the movement of objects or persons or faces and to extrapolate their views when they move or turn. This approach may be based on artificial intelligence. This approach for the prediction can be considered at the processing entity to compensate for cases when no mesh can be retrieved from the 3D camera, by way of example in view of uplink bandwidth limitations or might be sent in real time to the XR device when there are downlink bandwidth limitations.

Figure 11:
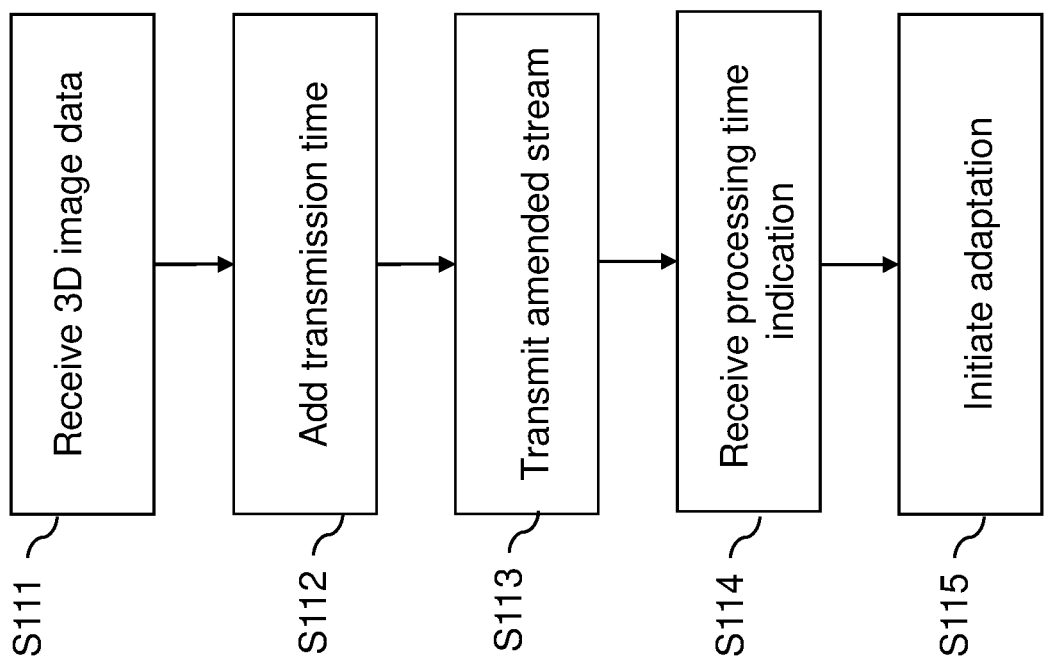
FIG. 11 shows an example flowchart of a method carried out by the processing entity involved in the processing as discussed in connection with FIGS. 2 to 10.

FIG. 11 summarizes some of the steps carried out by the processing entity 100 in the example of synchronizing the different parts of the image data stream, namely the first stream representing the structure and the second stream representing the visual appearance which are contained in this 3D image data stream. In step S111 the processing entity 100 receives this real data stream which comprises a first part or first image data stream representing the structure of at least one real world object such as a human being, wherein the 3D data stream comprises a second stream part, the second image data stream representing the visual appearance of the object. In step S112 the processing entity adds a corresponding transmission time indication to each of the stream parts, namely to the first image data stream and the second image data stream so that an amended stream is generated which comprises an amended first stream and an amended second stream. This was discussed above in connection with FIG. 10 in step S102. The transition time indication can be the same for both streams, the first stream or the second stream, but they may also be distinct and specific for each of the streams. In step S113 the amended stream which now includes the transmission time is transmitted to the extended reality device as also discussed in step S103. In step S114 the processing entity then receives the processing time indication for each of the different parts of the amended stream. This was discussed above in step S105. With the knowledge of the transmission time indication and the processing time indication for the different components of the amended stream and the received stream, it is possible to initiate an adaptation of either the received 3D image data stream as received by the processing unit or an adaption of the stream as amended by the processing entity. Furthermore, it is possible that both the 3D image data stream and the amended stream are adapted.

Figure 4:
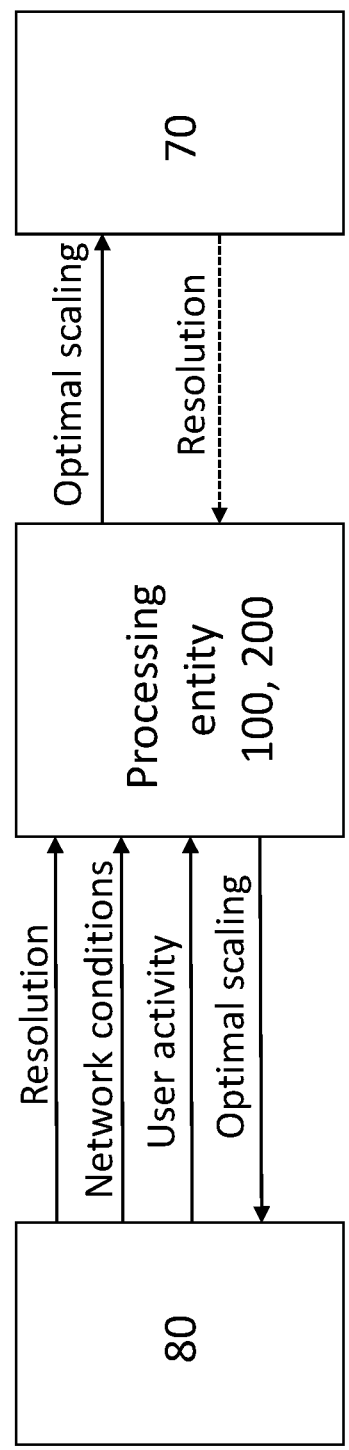
FIG. 4 shows in further detail the exchange of information which helps to improve the streaming of a 3D image data stream in a system as shown in FIGS. 2 and 3.

FIG. 12 summarizes the steps carried out by the processing entity 100 or 200 in connection with FIGS. 4 and 8.

Step S121 describes the reception of the resolution as received from the 3D camera. Furthermore, in step S122 an activity of the object shown in a scene of the 3D image data stream is determined. This activity may be received from the side of the camera or may be determined internally within the processing entity if the 3D image data stream is already received. Furthermore, in step S123 a transmission bandwidth of the wireless network is determined which is used for the uplink transmission of the data stream to the processing entity. Based on the received information the processing entity can in step S124 determine a frame rate which is to be used by the 3D camera for the image data stream part representing the structure and the frame rate to be used by the camera for the part of the image data stream representing the visual appearance of the objects shown in the stream. In step S125 the processing entity informs the 3D camera of a scaling parameter which describes the ratio of the frame rate of the stream part comprising the structure relative to the frame rate of the stream part comprising the visual appearance.

FIG. 13 shows a schematic view of the processing entity which can carry out the above discussed steps in which it is involved. As mentioned above, the processing entity may be implemented in a cloud environment so that the hardware components or virtual machines used to provide the processing capacity are distributed over different nodes of the cloud environment. Nevertheless, for the sake of clarity the different components are shown in FIG. 12 as single modules. The processing entity 100 comprises an interface 110 that is used to transmit 3D data streams or control messages to other entities such as the amended stream to the XR device. The interface 110 is furthermore configured to receive the stream from the 3D camera and is configured to receive data such as the camera resolution, user activity or transmission bandwidth of the wireless network. The processing entity furthermore comprises a processing unit 120 which is responsible for the operation of the processing entity 100. The processing unit 120 can comprise one or more processors and can carry out instructions stored on a memory 130, wherein the memory may include a read only memory, a random access memory, a mass storage, a hard disk or the like. The memory can furthermore include suitable program code to be executed by the processing unit 120 so as to implement the above-described functionalities in which the processing entity is involved.

FIG. 14 shows another schematic architectural view of a processing entity comprising a first module configured to receive the 3D image data stream comprising the two parts. Module 320 is provided configured to add an individual transmission time indication to each of the different stream parts. A module 330 is provided which is configured to transmit the amended stream including the transmission time indication to the XR device. A module 340 is configured to receive the processing time for each of the amended stream parts. A module 350 is provided which is configured to initiate the adaptation of at least one of the data streams (first data stream or second data stream) based on the received information.

Figure 15:
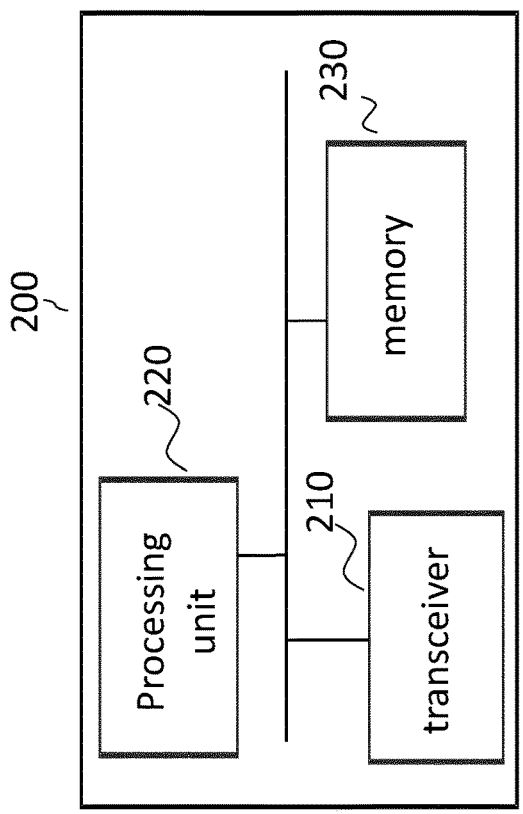
FIG. 15 shows an example schematic representation of the processing entity configured to carry out a stream scaling.

FIG. 15 shows an example schematic representation of a processing entity which may only carry out the stream scaling as discussed in connection with FIG. 8. As already mentioned in connection with FIG. 13, the processing entity 200 can be implemented in a cloud environment so that the different hardware components or virtual machines are distributed within the cloud. Nevertheless, the processing entity 200 comprises an interface 210 which is provided for transmitting data streams or control messages to other entities and which is configured to receive data streams or control messages from other entities. The interface is configured to receive information such as the camera setting or the user activity or the network conditions. Furthermore, the interface can transmit the scaling to the camera or to the XR device. The entity 200 furthermore comprises a processing unit 220 which is responsible for the operation of the entity 200. The processing entity 220 comprises one or more processors and can carry out instructions stored on a memory 230, wherein the memory may include a read-only memory, a random access memory, a mass storage, a hard disk or the like. The memory can furthermore include suitable program code to be executed by the processing unit 220 so as to implement the above-described functionalities in which the processing entity 200 is involved.

Figure 16:
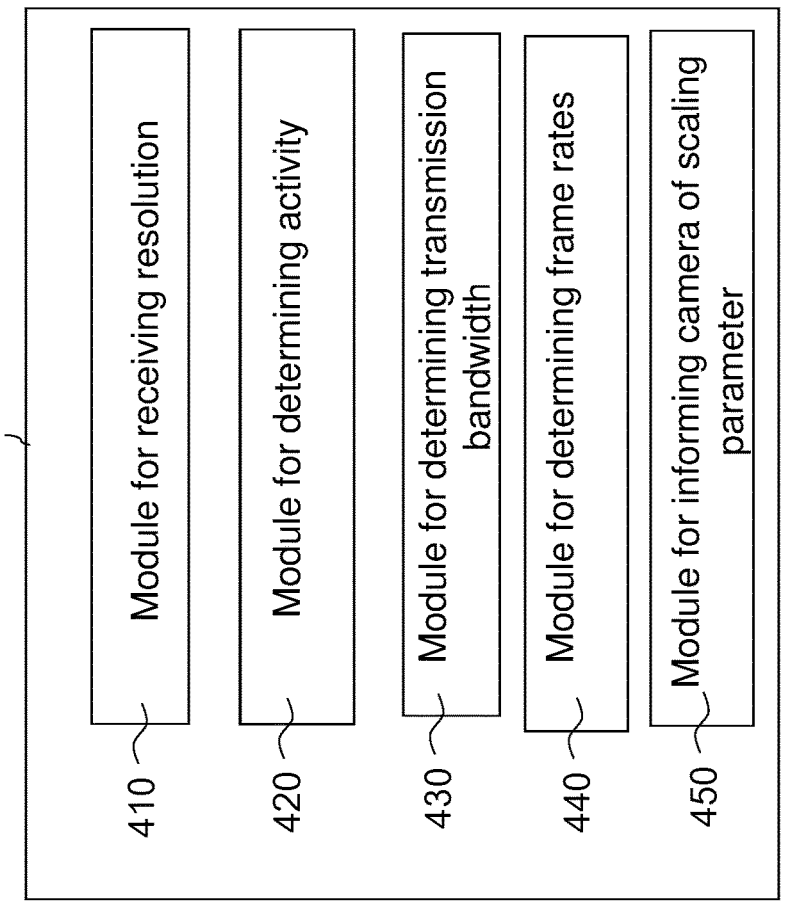
FIG. 16 shows an another example schematic representation of the processing entity configured to carry out a stream scaling.

FIG. 16 shows a further example representation of a processing entity 400 which is configured to carry out the stream scaling. The entity 400 comprises a first module 410 configured to receive the resolution of the 3D camera. Furthermore, a module 420 is configured to receive a user activity which is present in a scene shown in the image data stream. A module 430 is provided which furthermore determines the transmission bandwidth of the wireless network which is used to transmit the 3D image data stream to the processing entity. A module 440 is provided configured to determine the frame rates of the different parts of the stream and a module 450 is provided which is configured to inform at least the camera of the scaling parameter indicating how the ratio of the frame rates the part of the stream including the meshes is rated to the frame rate of the part of the stream including the texture or UVs.

From the above discussion some general conclusions can be drawn: The processing entity 100 can furthermore determine, based on the processing time indication of the amended first and second stream, that one of the processing times of the amended first and second stream is shorter than the other at the extended reality device. When the adaptation is initiated it is possible to initiate a synchronization of the first and second amended stream at the extended reality device.

When the synchronization is initiated this can mean that a frame rate of one of the amended streams from the two amended streams is reduced, namely the amended stream which is processed slower than the other at the extended reality device. Furthermore, it is possible to request the extended reality device to drop a pending part of the amended data stream which is buffered at the extended reality device for display.

Furthermore, it is possible to request the 3D camera 80 which is configured to generate the 3D image data stream to adapt a frame rate of one of the first and second image data streams for which the corresponding first and second amended stream is processed faster at the extended reality device to a frame rate of the other of the received 3D image data streams for which the corresponding amended stream is processed slower at the extended reality device.

Furthermore, it is possible to compare the current values of the transmission time indication of the amended first stream and the amended second stream to the received processing time indications of the amended first stream and the amended second stream, wherein the adaptation is initiated based on the comparison.

Here it is possible to generate a first difference between a current value of the transmission time indication of the amended first stream and the received processing time indication of the amended first stream, and to generate a second difference between the current value of the transmission time indication of the amended second stream and the received processing time indication of the amended second stream. The adaptation is then initiated based on the first difference and a second difference. This was discussed above in further detail by equation 2 mentioned above.

If at least one of the first difference and the second difference is larger than a first time interval but smaller than a second time interval, a transmission rate of the amended stream transmitted to the extended reality device may be reduced. Furthermore, when at least one of the first difference and the second difference is larger than a second time interval the extended reality device is asked to drop pending data stream frames pending at the extended reality device for display, wherein a current part of the amended stream which is currently present at the processing entity for transmission is transmitted to the extended reality device.

The first image data stream can comprise at least one of meshes and point clouds wherein the second image data stream can comprise a texture for at least one of the meshes and point clouds and may comprise a UV mapping. Furthermore, a further stream part such as a third stream part or third stream may be provided which also comprises audio data.

A rendering time for rendering the content at the extended reality device may be determined based on the processing time and the rendering time is transmitted to the 3D camera.

Furthermore, it is possible to determine an area of interest in a scene represented in the 3D image data stream in which an increased movement of the at least one real world object is detected, wherein the movement is increased compared to other areas of the 3D image data stream. Information about the area of interest is then transmitted to the 3D camera configured to generate the 3D data stream.

Furthermore, it is possible to determine a future area of interest in a scene represented in the 3D image data stream in which an increased movement of the at least one real world object is expected based on the already determined area of interest and a determined movement of the at least one real world object, wherein information about the future area of interest is transmitted to the 3D camera.

The 3D camera can then use this information and focus or limit the transmission of meshes in the future area of interest.

Furthermore, it is possible to determine an activity score based on the area of interest which reflects a degree of activity shown in the area of interest. A proposed frame rate is then determined for the first image data stream which is based on the activity score and which is transmitted to the 3D camera so that the 3D camera can then use the proposed frame rate.

The 3D image data stream can be received via an uplink wireless network from the 3D camera 80 wherein it is transmitted via a downlink wireless network to the extended reality device 70. The processing device 100 can receive a resolution indicator from the 3D camera 80 which indicates the resolution used in the 3D camera. Furthermore, it can determine an activity of the at least one real world object shown in the 3D image data stream, wherein the determination may be either received from the camera itself or may be determined within the processing entity based on consecutive frames of the 3D image data stream. Furthermore, a transmission bandwidth for the uplink wireless network may be determined which is used to transmit the 3D image data stream to the processing entity 100. Furthermore, a first frame rate can be determined which is to be used by the 3D camera for the first image data stream, the part of the stream including the geometry, wherein a second frame rate is determined which should be used by the 3D camera 80 for the second image data stream, the part including the visual appearance, wherein the two frame rates may be determined taking into account the resolution indicator, the transmission bandwidth and the determined activity. Furthermore, the 3D camera may be informed of the scaling parameter which is a parameter which is determined based on the first frame rate and the second frame rate.

The frame rate may be determined as a ratio of the frame rate of the first image data stream relative to a frame rate of the second image data stream within the 3D image data stream.

The at least one real world object can comprise a living creature such as a human being.

As indicated, the 3D image data stream may comprise a third stream including audio data.

The above discussed solution addresses a bandwidth and latency problem which may occur in the streaming of 3D image data streams which results in an improved user experience. The optimized solution can be used for XR conferencing scenarios that work under real time constraints.

The invention claimed is:

1. A method for operating a processing entity configured to process a three-dimensional (3D) image data stream for transmission over a wireless network to an extended-reality device, the method comprising:
   receiving the 3D image data stream, the 3D image data stream comprising a first image data stream representing a structure of at least one real-world object and a second image data stream representing a visual appearance of the at least one real-world object;
   adding a corresponding transmission-time indication to each of the first image data stream and the second image data stream, resulting in an amended stream comprising an amended first stream and an amended second stream;
   transmitting the amended stream over the wireless network to the extended reality device; obtaining, from the extended-reality device:
   i) a first processing time indication indicating a first amount of time taken by the extended reality device to process one or more elements from the amended first stream; and ii) a second processing time indication indicating a second amount of time taken by the extended reality device to process one or more elements from the amended second stream;

determining whether an adapting condition is satisfied, wherein the determination of whether the adapting condition is satisfied is based on i) the indicated first amount of time taken by the extended reality device to process the one or more elements from the amended first stream and ii) the indicated second amount of time taken by the extended reality device to process the one or more elements from the amended second stream; and initiating an adapting of at least one of the 3D image data stream and the amended stream as a result of determining that the adapting condition is satisfied.

2. The method of claim 1, wherein initiating the adapting comprises initiating a synchronization of the first and second amended stream at the extended reality device.

3. The method of claim 2, wherein initiating the synchronization comprises:

reducing a frame rate of one of the amended streams from the two amended streams which is processed slower than the other, requesting the extended reality device to drop a pending part of the amended data stream which is buffered at the extended reality device for being displayed, and/or requesting a 3D camera configured to generate the received 3D image data stream to adapt a frame rate of one of the first and second image data streams, for which the corresponding first or second amended stream is processed faster at the extended-reality device to a frame rate of other of the received 3D image data stream, for which the corresponding amended stream is processed slower at the extended-reality device.

4. The method of claim 1, further comprising comparing current values of the transmission time indication of the amended first stream and the amended second stream to the obtained processing time indications of the amended first stream and the amended second stream, wherein the adaptation is initiated based on the comparison.

5. A non-transitory computer readable storage medium storing a computer program comprising program code executable by at least one processing unit of a processing entity, wherein execution of the program code causes the processing entity to perform the method of claim 1.

6. A method for operating a processing entity configured to receive a three dimensional (3D) image data stream generated by a 3D camera over a wireless network, the 3D image data stream comprising a first image data stream representing an structure of at least one real-world object, and a second image data stream representing a visual appearance of the at least one real-world object, the method comprising:

receiving, from the 3D camera, a resolution indicator indicating a resolution of the 3D camera;

determining an activity of the at least real-world object shown in the 3D image data stream;

determining a transmission bandwidth of a further wireless network used to transmit the 3D image data stream to the processing entity;

determining a first frame rate to be used by the 3D camera for the first image data stream and a second frame rate to be used by the 3D camera for the second image data stream taking into account the resolution indicator, the transmission bandwidth and the determined activity;

determining, based on the determined first frame rate and second frame rate, a scaling parameter; and informing the 3D camera of the determined scaling parameter determined based on the determined first frame rate and second frame rate.

7. A non-transitory computer readable storage medium storing a computer program comprising program code executable by at least one processing unit of a processing entity, wherein execution of the program code causes the processing entity to perform the method of claim 6.

8. A processing entity configured to transmit three-dimensional (3D) image data over a radio link to an extended reality device, the processing entity comprising:

a receiver for receiving the 3D image data stream, the 3D image data stream comprising a first image data stream representing a structure of at least one real-world object and a second image data stream representing a visual appearance of the at least one real-world object;

memory; and processing circuitry, wherein the processing entity is configured to perform a method comprising:

adding a corresponding transmission-time indication to each of the first image data stream and the second image data stream, resulting in an amended stream comprising an amended first stream and an amended second stream;

transmitting the amended stream over the wireless network to the extended reality device;

obtaining, from the extended-reality device:

i) a first processing time indication indicating a first amount of time taken by the extended reality device to process one or more elements from the amended first stream; and ii) a second processing time indication indicating a second amount of time taken by the extended reality device to process one or more elements from the amended second stream;

determining whether an adapting condition is satisfied, wherein the determination is based on i) the indicated first amount of time taken by the extended reality device to process the one or more elements from the amended first stream and ii) the indicated second amount of time taken by the extended reality device to process the one or more elements from the amended second stream; and initiating an adapting of at least one of the 3D image data stream and the amended stream as a result of determining that the adapting condition is satisfied.

9. The processing entity of claim 8, wherein initiating an adaptation comprises initiating a synchronization of the first and second amended stream at the extended reality device.

10. The processing entity of claim 9, further being operative, for initiating the synchronization, to:

reduce a frame rate of one of the amended streams from the two amended streams which is processed slower than the other, request the extended reality device to drop a pending part of the amended data stream which is buffered at the extended reality device for being displayed, and/or request a 3D camera configured to generate the received 3D image data stream to adapt a frame rate of one of the first and second image data streams, for which the corresponding first or second amended stream is processed faster at the extended-reality device to a frame rate of other of the received 3D image data stream, for which the corresponding amended stream is processed slower at the extended-reality device.

11. The processing entity of claim 8, further being operative to compare current values of the transmission time indication of the amended first stream and the amended second stream to the obtained processing time indications of the amended first stream and the amended second stream, and to initiate the adaptation based on the comparison.

12. The processing entity of claim 11, further being operative to generate a first difference between a current value of the transmission time indication of the amended first stream and the obtained processing time indication of the amended first stream and to generate a second difference between the current value of the transmission time indication of the amended second stream and the obtained processing time indication of the amended second stream, and to initiate the adaptation based on the first difference and the second difference.

13. The processing entity of claim 12, further being operative, if at least one of the first difference and the second difference is larger than a first time interval but smaller than a second time interval, to reduce a transmission rate of the amended stream transmitted to the extended reality device.

14. The processing entity of claim 12, further being operative, if at least one of the first difference and the second difference is larger than a second time interval, to ask the extended reality device to drop pending data stream frames of the amended stream pending at the extended reality device for display, and to transmit a current part of the amended stream currently present at the processing entity to the extended reality device.

15. The processing entity of claim 8, wherein the first image data stream comprises at least one of meshes and point clouds, and the second image data stream comprises a texture for at least one of meshes and point clouds and a UV mapping.

16. The processing entity of claim 8, further being operative to determine a rendering time and transmit the rendering time to the 3D camera.

17. The processing entity of claim 8, further being operative to determine an area of interest in a scene represented in the 3D image data stream in which an increased movement of the at least one real-world object compared to other areas of the 3D image data stream is detected, and to transmit information about the area of interest to a 3D camera configured to generate the 3D image data stream.

18. The processing entity of claim 17, further being operative to determine a future area of interest in a scene represented in the 3D image data stream in which the increased movement of the at least one real-world object is expected based on the area of interest and a determined movement of the at least one real world object, and to transmit information about the future area of interest to the 3D camera.

19. The processing entity of claim 17, further being operative to determine an activity score based on the area of interest reflecting a degree of activity shown in the area of interest, and to determine a proposed frame rate for the first image data stream based on the activity score and to transmit the proposed frame rate to the 3D camera.

20. The processing entity of claim 8, wherein the 3D image data stream is received via a further wireless network from a 3D camera configured to generate the received 3D image data stream, the processing entity being operative to:
receive, from the 3D camera, a resolution indicator indicating a resolution of the 3D camera,
determine an activity of the at least one real-world object shown in the 3D image data stream,
determine a transmission bandwidth of the further wireless network used to transmit the 3D image data stream to the processing entity,
determine a first frame rate to be used by the 3D camera for the first image data stream and a second frame rate to be used by the 3D camera for the second image data stream taking into account the resolution indicator, the transmission bandwidth and the determined activity,
inform the 3D camera of a scaling parameter determined based on the determined first frame rate and of the second frame rate.

21. The processing entity of claim 20, further being operative to determine the scaling parameter as a ratio of a frame rate of the first image data stream relative to a frame rate of the second image data stream within the 3D image data stream.

22. The processing entity of claim 8, wherein the at least one real-world object comprises a living creature.

23. The processing entity of claim 8, wherein the 3D image data stream further comprises a third stream comprising audio data.

24. A processing entity configured to receive a three-dimensional (3D) image data stream generated by a 3D camera over a wireless network, the data stream comprising a first image data stream representing an structure of at least one real-world object, and a second image data stream representing a visual appearance of the at least one real-world object, the processing entity being operative to:
receive, from the 3D camera, a resolution indicator indicating a resolution of the 3D camera,
determine an activity of the at least real-world object shown in the 3D image data stream,
determine a transmission bandwidth of a further wireless network used to transmit the 3D image data stream to the processing entity,
determine a first frame rate to be used by the 3D camera for the first image data stream and a second frame rate to be used by the 3D camera for the second image data stream taking into account the resolution indicator, the transmission bandwidth and the determined activity,
determining, based on the determined first frame rate and second frame rate, a scaling parameter, and
inform the 3D camera of the determined scaling parameter determined based on the determined first frame rate and the second frame rate.

25. The processing entity of claim 24, further being operative to inform an extended reality device where the 3D image data stream is displayed, of the scaling parameter.

26. The processing entity of claim 24, wherein the scaling parameter comprises a ratio of a frame rate of the first image data stream relative to a frame rate of the second image data stream within the 3D image data stream.

* * * * *